United States Patent Office.

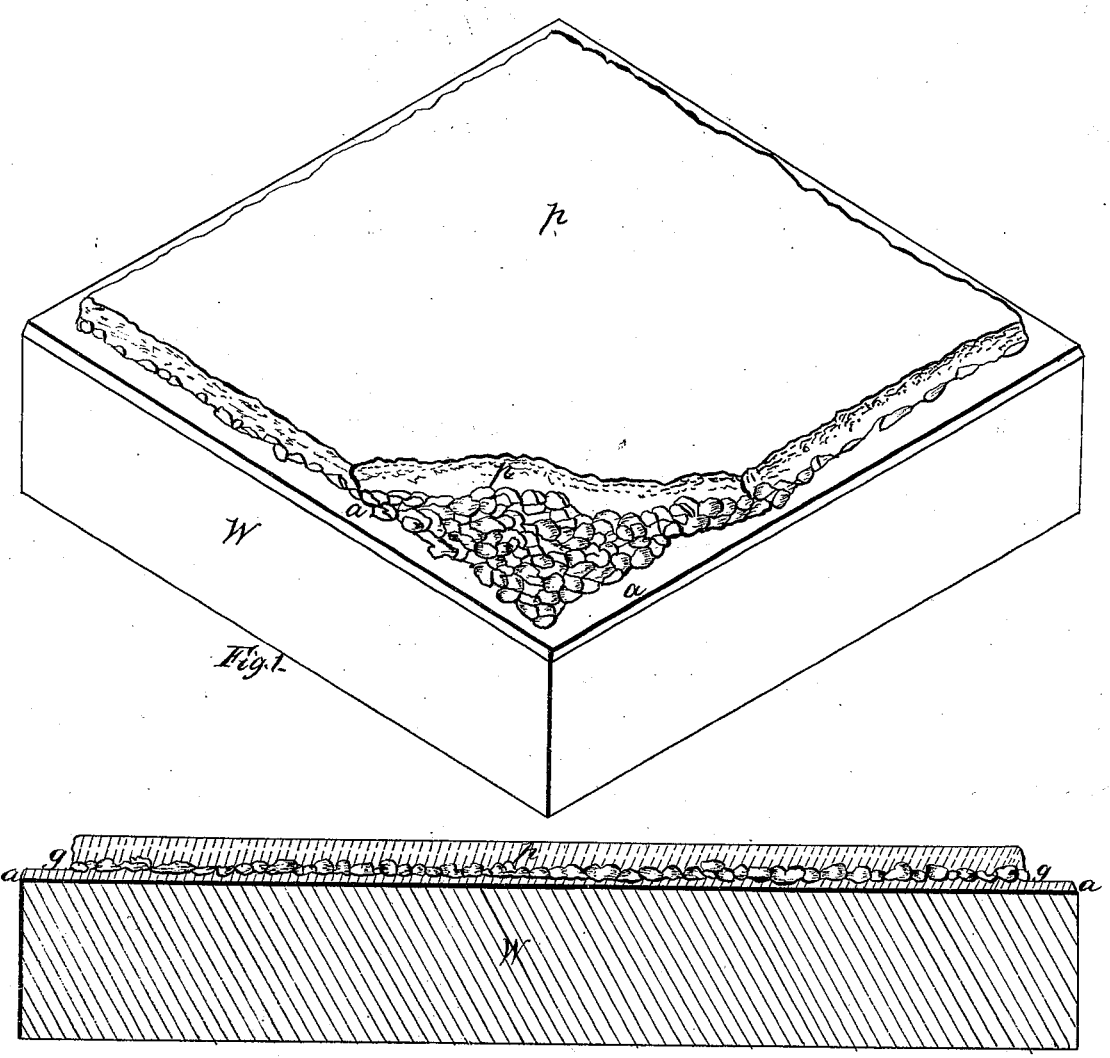

WILLIAM E. WORTHEN, OF NEW YORK, AND TOBIAS NEW, OF BROOKLYN, NEW YORK.

Letters Patent No. 95,300, dated September 28, 1869.

---

IMPROVED MODE OF PROTECTING PLASTERED WALLS AGAINST DAMPNESS.

---

The Schedule referred to in these Letters Patent and making part of the same.

---

To all whom it may concern:

Be it known that we, WILLIAM E. WORTHEN, of the city, county, and State of New York, and TOBIAS NEW, of the city of Brooklyn, county of Kings, State of New York, have invented a new and useful Preparation and Construction of Surfaces, for the reception of plaster and mastic, and that the following, taken in connection with the drawings, is a full and exact description thereof.

Figure 1 is a drawing, in isometrical perspective, of a tile, with the plastering attached thereto, and a large portion of the surface covered with a coat of plaster.

Figure 2 is a section of the above.

The tile W represents the wall of a building, the dark surface $a$ $a$, a coat of asphaltum, coal, candle, or pine-tar, or a mixture composed wholly, or in part of these substances.

$g$ $g$ is a coat of gravel, and $p$ $p$, a coat of plaster or mastic.

It is well known that it is almost impossible to prevent the wet from rain and storms, striking through the exterior walls of buildings, and that on this account plastering is never put directly on the interior face of exterior walls, as it often is on the faces of interior walls, but that the inside of exterior walls is almost invariably furred for the reception of the lathing, and thus leaving an air-space between the wall and the plastering, and that even with this precaution, that in long-continued storms the wet will be so driven through the walls that the furring becomes soaked and the plastering becomes damp on the weather-side of the building.

To prevent this, it is not uncommon to paint the exterior of the walls, and in cases where the color might not be objectionable, to put on some asphalt or rubber cements.

Again, the exterior of walls are often coated with what is denominated in the trade as mastic. Through this mastic the moisture still penetrates, the walls become damp, and the action of the frost tends to throw off the mastic coat from the face of the wall.

Our invention may be applied to the preparation of a surface for the reception of mastic, but our experiments have been chiefly confined to interior surfaces of walls, and preparing these surfaces for the reception of the usual coats of plaster.

The invention consists essentially in coating the entire surface of the wall with asphaltum, coal, candle, or pine-tar, or mixture of like ingredients, similar to those now in use, for the preservation of walls from dampness, and in these mixtures, while soft upon the walls, forcing in gravel, sand, sawdust, or similar substances, which may be retained strongly in the mixtures, and afford, by their roughness, a sufficient clinch or hold for the plaster coats.

We have experimented with various substances, gravel, sawdust, chips, and coarse bagging or canvas, and prefer the gravel as the cheapest material and most readily applied.

In the application of the tarry mixtures, the same care should be taken that is now used in their application to walls that the walls should be sufficiently dry to retain the mixture, and that the consistency of the mixture should be such that it does not cool so quickly that the gravel or roughing-substance cannot be forced into the mixture, nor yet so soft that under the influence of summer temperatures, natural or artificial, that the mixture may not run down the wall.

In our experiments, we have found no difficulty in thus tempering the mixture, using for the purpose the usual preparation of asphalt or coal-tar, as prepared for roofing-purposes, as in the application to Warren's patent roofing.

By this invention, the room occupied by the furring and lathing is saved, and more important, the air-space, which often becomes a passage-way or lodgement for vermin, or a flue, in case of fire, is effectually cut off.

We know that both horizontal and vertical walls have often been covered with the above mixtures, and we also know that gravel roofs, so called, are composed usually of layers of tarred paper, with a coat of some tarry mixture, over which gravel is sprinkled while hot, and is cemented into the same, as a load to retain the paper and protect the tar.

We do not, therefore, claim any such application of asphalt, coal, candle, or pine-tar or mixtures, composed entirely, or in part of these substances; but We do claim—

The incorporating into these above mixtures, when applied as a coat to the surface of walls, of gravel, sawdust, chips, bagging, or like substances, for the purpose of roughening the surface sufficiently for the retention of plaster or mastic.

W. E. WORTHEN.
T. NEW.

Witnesses:
F. L. KANE,
ERASTUS F. BROWN.